(12) United States Patent
Cherukuri et al.

(10) Patent No.: US 8,543,641 B2
(45) Date of Patent: *Sep. 24, 2013

(54) METHOD AND SYSTEM OF APPLICATION DELIVERY THROUGH APPLICATION TEMPLATE TO CLIENT DEVICE

(75) Inventors: Rao Cherukuri, Los Altos Hills, CA (US); Rajavel Lenin, Livermore, CA (US)

(73) Assignee: Deskstream, Inc., Sunnyvale, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 12/826,696

(22) Filed: Jun. 30, 2010

(65) Prior Publication Data

US 2012/0005255 A1 Jan. 5, 2012

(51) Int. Cl.
*G06F 15/16* (2006.01)
(52) U.S. Cl.
USPC .......................................................... 709/203
(58) Field of Classification Search
None
See application file for complete search history.

(56) References Cited

U.S. PATENT DOCUMENTS

2009/0043840 A1* 2/2009 Cherukuri et al. ............ 709/203
2010/0332617 A1* 12/2010 Goodwin et al. ............. 709/219

OTHER PUBLICATIONS

Russinovich et al. "Disk2vhd 1.0". Published Oct. 7, 2009.*

* cited by examiner

*Primary Examiner* — Scott Christensen
(74) *Attorney, Agent, or Firm* — Raj Abhyanker, P.C.

(57) ABSTRACT

In one embodiment, a method of a client device includes accessing an application through an application template. The application template resides on server device. The method also includes accessing application based on a response to request of a user interface. In addition, the method includes processing the application through a processor such that the application accesses the application template such that the client device permits an access of the application through the application template. The method further includes executing the application through the application template such that an execution of the application through the application template emulates the execution of the application installed on an operating system of the client device. The method also includes executing a function of the application template based on a demand of a user through the response to the request of the user such that the file is accessed when required by the application.

20 Claims, 12 Drawing Sheets

| LAYER | SOFTWARE | FILE NAME | DIRECTORY |
|---|---|---|---|
| DESKTOP | WORD PROCESSING APPLICATION | TEST.TXT | C:\TEST.TXT |
| TEMPLATE | WORD PROCESSING APPLICATION | TEST.TXT | - |
| TEMPLATE | WORD PROCESSING APPLICATION | X.TXT | C:\X.TXT |
| TEMPLATE | DATABASE APPLICATION | Y.XLS | C:\Y.XLS |
| HOST | OPERATING SYSTEM | Z.TXT | C:\Z.TXT |

VIRTUAL FILE SYSTEM 450

FIGURE 4

| LAYER | LAYER ID | KEY | KEY ID | DELETED | VIRTUAL INDEX |
|---|---|---|---|---|---|
| DESKTOP | 2 | A | 0 | NO | 0 |
| DESKTOP | 2 | B | 1 | NO | 1 |
| DESKTOP | 2 | C | 2 | NO | 2 |
| TEMPLATE | 1 | A | 0 | NO | - |
| TEMPLATE | 1 | D | 1 | YES | - |
| TEMPLATE | 1 | E | 2 | NO | 3 |
| HOST | 0 | B | 0 | NO | - |
| HOST | 0 | F | 1 | NO | 4 |

VIRTUAL REGISTRY SYSTEM 850

FIGURE 8

| LAYER ID | | VIRTUAL INDEX | | | | |
|---|---|---|---|---|---|---|
| | - | 0 | 1 | 2 | 3 | 4 |
| 0 | 2 | 0 | 1 | 2 | -1 | -1 |
| 1 | 1 | 0 | -1 | -1 | 2 | -1 |
| 2 | 0 | -1 | 0 | -1 | -1 | 1 |

VIRTUAL REGISTRY SYSTEM 950

FIGURE 9

METHOD AND SYSTEM OF APPLICATION DELIVERY THROUGH APPLICATION TEMPLATE TO CLIENT DEVICE

FIELD OF TECHNOLOGY

This disclosure relates generally to a technical field of application delivery and, in one example embodiment, to method and system of software application delivery through application template to a client device.

BACKGROUND

An enterprise may have several employees and each of those employees may utilize several software applications. Each employee may have a client device and several applications may be installed on the client device of the employee. Several employees may have a copy of the same software application installed on each of their respective computers. As a result, there may be multiple copies of the same application on several different computers.

The software application may need to be modified and/or updated. Modifying and/or updating the software application may require an administrator to install a patch through the client device. In enterprises, there may be multiple client devices managed by an administrator. It may be time consuming to install each application on each client device of the enterprise. The installation of security patch and/or other update may be time consuming, because the installation may require the time of the administrator to troubleshoot the update and/or software application. Provisioning a client device of a new user and/or restoring the client device of an existing user may be time consuming, because the software application and/or update may need to be installed on the client device. As a result, time and/or other resources of the administrator may be wasted causing a negative impact on business productivity.

SUMMARY

Disclosed are a method, an apparatus, and/or a system of software application delivery through application template to a client device.

In one aspect, a method of a client device includes accessing an application through an application template. The application template resides on a server device. The method also includes accessing the application based on a response to a request of a user interface. The method further includes processing the application through a processor such that the application accesses the application template such that the client device permits an access of the application through the application template.

In addition, the method includes executing the application through the application template such that an execution of the application through the application template emulates the execution of the application installed on an operating system of the client device. The method also includes executing a function of the application template based on a demand of a user through the response to the request of the user such that the file is accessed when required of the application.

The method of a client device may include translating between the application template and the operating system of the client device based on the type of the operating system such that the application may be accessible to a user of the client device. The method may also include processing one of a registry structure and a directory structure such that the application may be accessible to the user of the client device based on a translation between the application template the operating system of the client device.

In addition, the method may include creating the application template through the user interface of an administrator of the client device. The method may further include creating the application template such that the application template may be coupled to one of the registry structure and the directory structure such that the application may be accessible to the user of the client device. The method may also include creating the application template such that the application template may be editable through the user interface of the administrator.

In addition, the method may include caching the file of the application template on the client device such that a latency may be reduced when running the application through the server. The method may also include creating a file system based on the file of a layer such that the file of the layer, another file of another layer, and yet another file of yet another layer may be accessible to the user of the application. The layer may be a desktop layer, the another layer may be a template layer, and the yet another layer may be a host layer, such that the file of the desktop layer may be prioritized over the file of the template layer and the template layer may be prioritized over the host layer.

The method may further include creating a registry system based on an algorithm. The algorithm may map the registry key and a registry value of the layer, the another layer, and the yet another layer, such that the registry key and the registry value may be accessible through the registry system. The method may also include executing the application through the application template such that a setting may be customizable through the response of the request of the user such that the setting may be accessible to the user when the application may be accessed.

The method may include accessing the application template through a software as a service model through a cloud environment such that the application may be accessible through the application template. The user of the client device and another user of another client device may access the application through the application template. The application template of the client device and the application template of the another client device may be the same. The method may be in a form of a machine-readable medium embodying a set of instructions that when executed by a machine may cause the machine to perform the method of a client device.

In another aspect, the method of a server device includes permitting an access of an application through an application template. The application template may include one of an executable, a library, an image, a configuration file, and a registry key. The application template resides on a server. The method also includes accessing the application template based on a response to a request of a user interface. In addition, the method includes processing the application through a processor such that the application accesses the application template such that a client device permits the access of the application through the application template. The method also includes determining a translation file based on a type of an operating system of the client device such that the application is accessible to a user of the client device.

The method may further include permitting the access of another application of the client device such that the another application may be accessible through the another application template. The another application template may replace the application template such that the another application template may be a later version of the application template. The method may also include permitting the access of the application through the application template such that a setting may be customizable through the response of the request of the user such that the setting may be accessible to the user when the application may be accessed.

Furthermore, the method may include accessing a file of the application template based on a demand of the user through the response to the request of the user such that the file may be accessed when required of the application. The method may also include permitting the access of the application template through a software as a service model through a cloud environment such that the application may be accessible through the application template. The user of the client device and another user of another client device may access the application through the application template. The application template of the client device and the application template of the another client device may be the same.

In addition, the method may include permitting the access of the application through the application template such that the application may be accessible to the client device and another client device through the application template. The application template of the client device and the application template of the another client device may be the same. The method may also include permitting the access of the application through a binary module coupled to the application template. The binary module may emulate a set of a function call between the application and the operating system of the client device.

In yet another aspect, a system includes a server to permit an access of an application based on a response to a request of a user interface. The system also includes a client device to process the application through a processor such that the application is accessible to a user based on the response to the request of the user interface. The system further includes an application template to emulate a function of the application. The application template includes one of an executable, a library, an image, a configuration file, and a registry key such that the access of the application through the application template is accessible to the client device and another client device through the application template. The application template of the client device and the application template of the another client device are the same.

BRIEF DESCRIPTION OF THE DRAWINGS

The embodiments of this invention are illustrated by way of example and not limitation in the figures of the accompanying drawings, in which like references indicate similar elements and in which:

FIG. 4 illustrates a virtual file system (VFS), in accordance with one or more embodiments.

FIG. 8 illustrates the virtual registry system, in accordance with one or more embodiments.

FIG. 9 illustrates a virtual registry system including registry values, in accordance with one or more embodiments.

Other features of the present embodiments will be apparent from the accompanying drawings and from the detailed description that follows.

DETAILED DESCRIPTION

A method, apparatus, and/or system of software application delivery through application template to a client device are disclosed. Although the present embodiments have been described with reference to specific example embodiments, it will be evident that various modifications and changes may be made to these embodiments without departing from the broader spirit and scope of the various embodiments.

Figure 1:
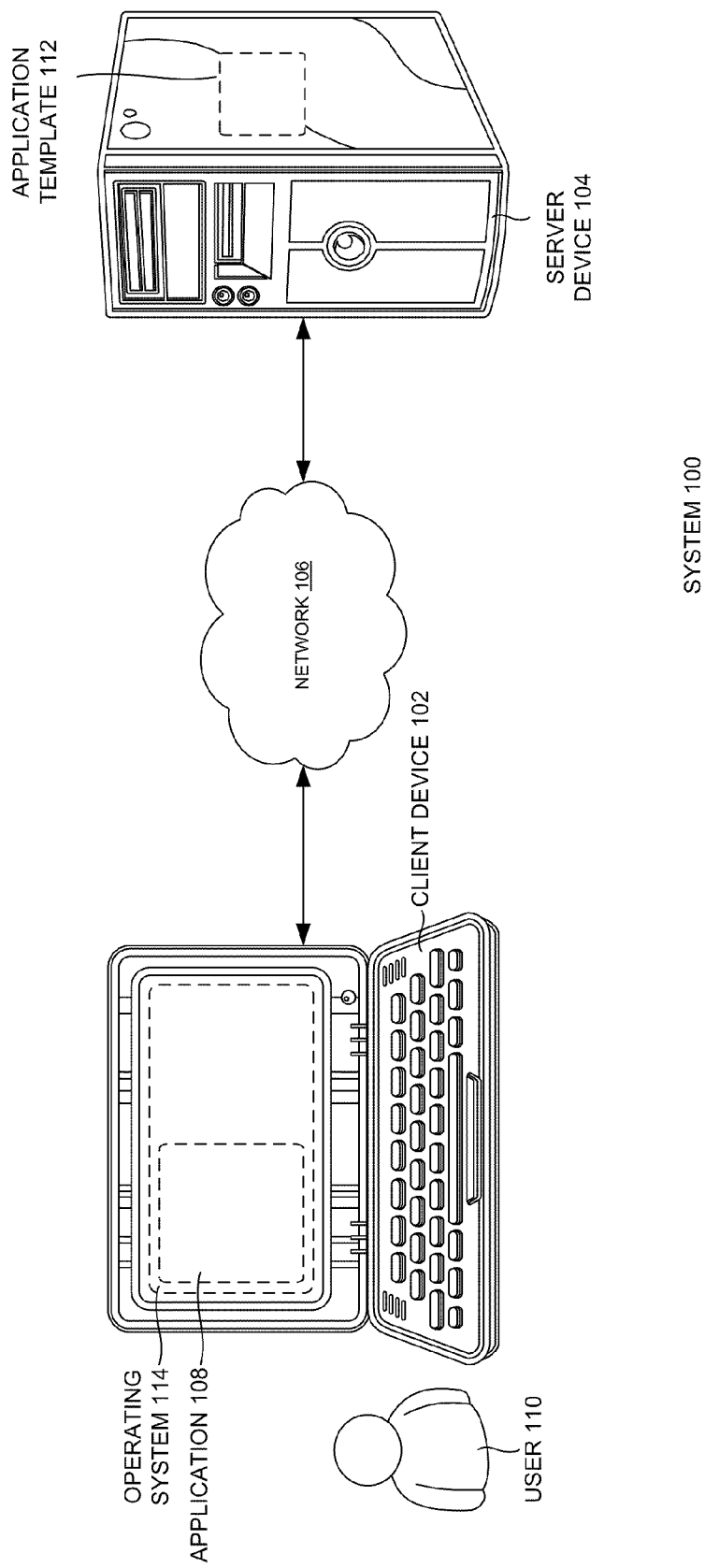
FIG. 1 illustrates a system of software application delivery through application template to a client device, in accordance with one or more embodiments.

FIG. 1 illustrates a system 100 of software application delivery through application template to a client device, in accordance with one or more embodiments. The application may be delivered through a cloud computing environment. In one or more embodiments, the system 100 includes a client device 102 in communication with a server device 104 through a network 106. Examples of the network 106 include, but are not limited to a local area network, a wide area network, a wireless network, a wired network, a mobile communication network, a Zigbee, and the like. The client device 102 processes, through a processor, an application 108 such that the application 108 is accessible to a user 110 of the client device 102 based on a response to a request of a user interface. Example of the client device 102 includes, but is not limited to laptop, a desktop, a mobile computing device, a personal digital assistant, and a similar data processing device. The server device 104 may be configured to permit an access of the application 108 based on the response to the request of the user interface.

The server device 104 may include an application template 112 to emulate a function of the application 108. In one or more embodiments, a virtual container may be created for the client device 102 to virtualize the client device 102. The virtual container may be operatively coupled with the server device 104 and the client device 102. In one or more embodiments, the virtual container may be created through inheritance. Inheritance may include copying of folder structures of the client device 102 to a new location on the server device 104. The folder structure may be used to create a base template and information associated with the base template may be saved in a storage (e.g., a relational database) on the server device 104.

The application template 112 may include, but is not limited to an executable, a library, an image, a configuration file, and a registry key. The access to the application 108 may be allowed through the application template 112. In one or more embodiments, multiple client devices may be allowed to access one or more applications through one or more application templates in the server device 104. The client devices 102 may be allowed to use a common application template to access the applications through the common application template. The application 108 may include one or more components including a set of DLLs, a set of configuration files, and a set of executable files. The system 100 disclosed herein virtualizes one or more resources including the components and operating system 114 resources to access the application 108 through the client device 102 and provides the virtualized resources on demand to the user 110 of the client device 102.

In one or more embodiments, a virtual container may run multiple versions of the application 108. The virtual container may run different applications through different application templates. For instance, consider that the administrator of the client device 102 tries to install a gaming application into the client device 102. The files, registry and data associated with the installation and execution of the gaming application may be transferred to an application template created by an administrator, for the gaming application on the server device 104. When the administrator initiates the installation, the gaming application may get installed in the server device 104 and whenever the user tries to execute the gaming application, the gaming application may run in the virtual container using a host operating system associated with the application template on the server device. The user 110 accesses the gaming application running in the virtual container through the client device 102. Similarly, for example, a Windows Powerpoint application can be run on Linux operating system through the virtual container.

A desktop (e.g., logical container) may be created through the assignment of one or more templates to a user. The user desktop may contain a segregated storage for the user and one or more links to the assigned application templates. User data, user settings, and/or user installed applications may be saved in the segregated storage area of the user desktop.

When a user logs on, he may access to the virtual desktop assigned by the administrator to the user. When the user installs an application, the application may be installed on the virtual desktop of the user. Access to the virtual desktop of the user may be limited to the user.

When an administrator logs on, the administrator may install into an application template and/or a user virtual desktop. When the administrator installs an application into a template, the application may be automatically available to all users connected to the application template. When the administrator installs into a user virtual desktop, access to the virtual desktop may be limited to the user.

In one or more embodiments, the system 100 may also include a file system. The file system may allow organization of one or more files such that a file associated with a second application template of a second application is accessible to the user 110 of the client device 102 through a first application. The first application and the second application may be accessible to the user 110 of the client device 102. In one or more embodiments, the system 100 may also include a translation module to permit the access of the first application through an operating system of the client device 102 such that the first application is accessible to another operating system of the another client device. For example, a Word file can be accessible to a user using an application in Linux operating system. The operating system of the client device 102 and another operating system of another client device may be different.

The client device 102 may include a set of applications and/or user data/settings. To achieve operating system independency, the desktop may be decoupled from the operating system 114 of client device 102 to be able to run it on any operating system of the client device 102. The desktop may include an application, a data, and a setting. The client device may be physical hardware. In one or more embodiments, associating the virtual container with the client device 102 may involve installation and/or execution of an executable application supporting the virtual container, in the client device 102. In one or more embodiments, the user 110 may run the executable application to access the virtual container.

In one or more embodiments, the system 100 disclosed herein gives the ability to run the user desktop of the client device 102 from any other client devices and recover from a hardware/operating system failure and similar disasters of the client device 102. The system may allow running a user desktop on an upgraded hardware/OS instantly through the application templates. In addition, the user desktop of the client device 102 can be rendered accessible over the network 106, through one or more of a removable storage (e.g., USB drive), an external hard drive and/or directly on another client device.

Figure 2:
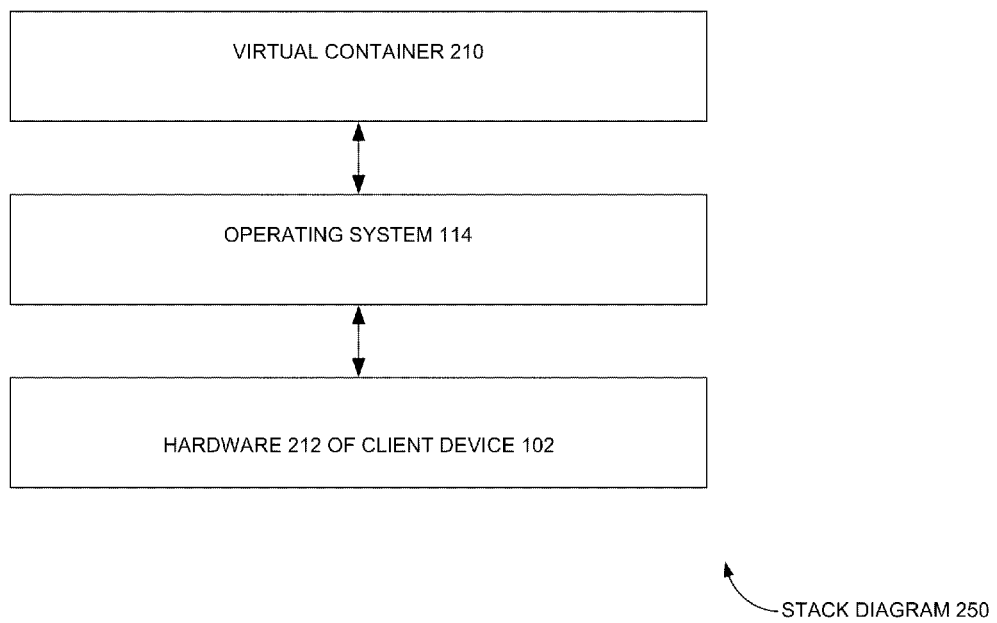
FIG. 2 is a stack diagram of system of FIG. 1, in accordance with one or more embodiments.

FIG. 2 is a stack diagram of system 100 of FIG. 1, in accordance with one or more embodiments. In one or more embodiments, the system stack includes hardware 212 of the client device 102 as the lowest layer. The system stack includes operating system of the client device 102 as an intermediate layer and a virtual container associated with the client device 102 as a top most layer. In one or more embodiments, one or more elements of the hardware 212 of the client device 102 may be copied into the virtual container to emulate the hardware 212 of the client device 102. The elements may include, for example, data, files, folders and the like associated with the hardware 212 of the client device 102.

Further, one or more registry and other files and data associated with the operating system 114 may also be extracted into the virtual container. In one or more embodiments, any application accessed/executed through the client device 102 may be decoupled from the operating system 114 of the client device 102 and may be executed through the virtual container on either a host operating system associated with a server device 104 or on the operating system 114 of the client device 102 in accordance with the requirements of the application.

Figure 3:
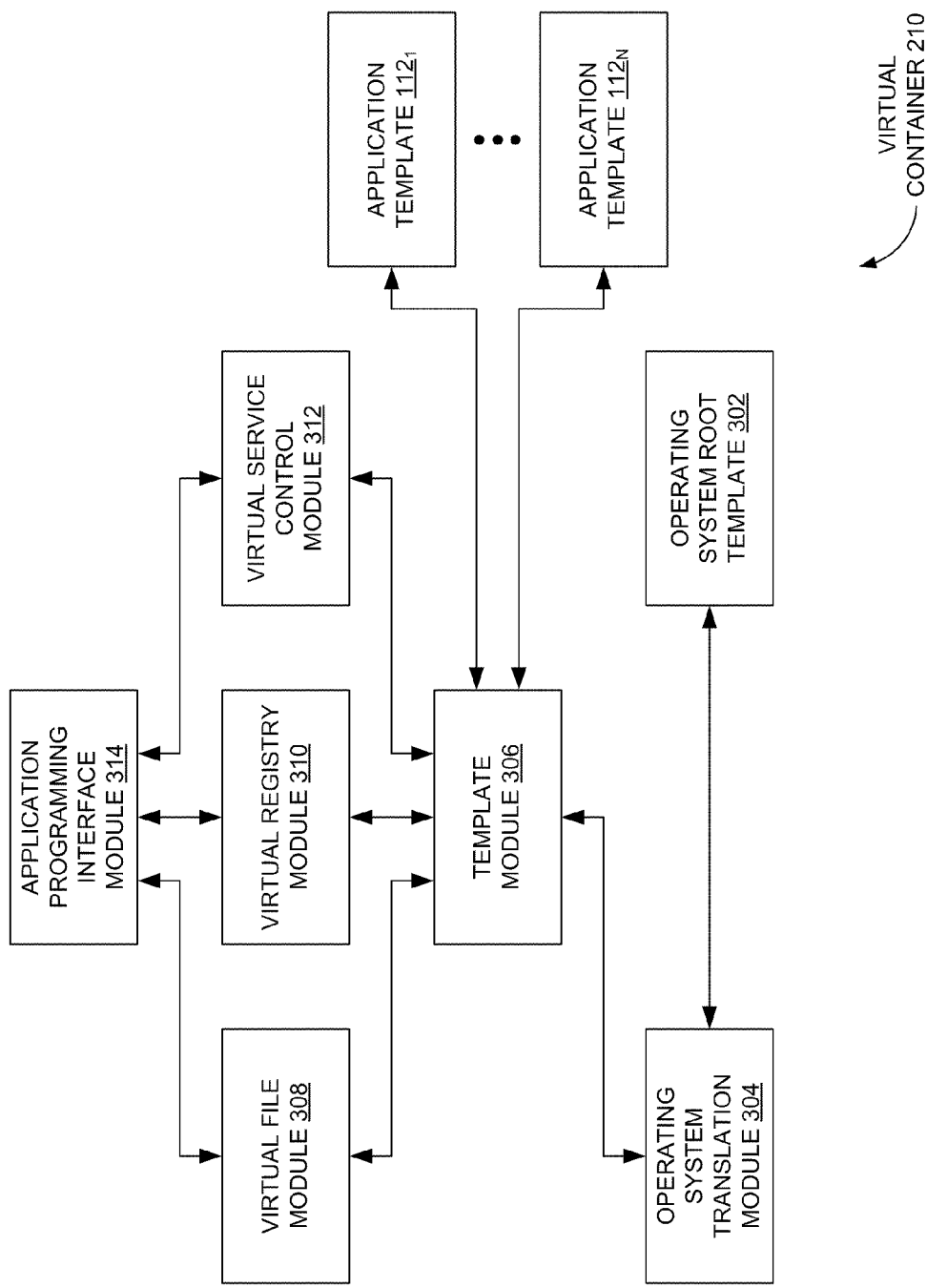
FIG. 3 illustrates a virtual container associated with the client device of FIG. 1, in accordance with one or more embodiments.

FIG. 3 illustrates a virtual container 210 associated with the client device 102 of FIG. 1, in accordance with one or more embodiments. In one or more embodiments, the virtual container 210 may include an application programming interface module 314. In one or more embodiments, the application programming interface module 314 is configured to interlock all file, registry, service control, event related calls made by system 100 and application 108 processes to allow the system 100 and application 108 processes to be processed by other subsystems of system 100 before a host kernel handles system 100 and application 108 processes. The interlocking allows redirecting resource request from applications either to the server device 104 or to the client device 102. The virtual container 210 may include a storage layer and a virtualization layer.

The storage layer may be an abstraction including information regarding components including, for example, a file storage (e.g., a uniform naming convention (UNC) path name of a network drive, and the like), registry storage (e.g., paths to reg.hives, names of reg.keys mapped to the reg.hives), and layer priority. The virtualization layer may be an abstraction including all virtualization components to virtualize one or more storage layers.

In one or more embodiments, the virtual container 210 may also include a virtual file module 306, a virtual registry module 310, and/or a virtual service control module 312. The virtual file module 306 may be configured to encapsulate native file system application programming interface calls for virtualization. The virtual registry module may be configured to encapsulate native registry application programming interface calls for virtualization. The virtual service control module 312 may be configured to control encapsulate native Windows® service calls. Services may be Windows® services that are running in the background of client device.

In one or more embodiments, the virtual container 210 may be configurable by a list of storage layers (e.g. host layer, template layer, desktop layer). Each of the virtual file module 308, virtual registry module 310 and/or virtual service control module 312 may be software modules and may include one or more virtual engines (e.g., functions). According to the list, the virtual container 210 creates a required number of virtual engine instances that will operate with pair of storages (e.g. desktop-template N, template N-1-template N-2, . . . , template1-host) independently. In one or more embodiments, the virtual engine may use table of content (TOC) trees to keep track of the files in various layers. The TOC may be a tree data structure, representing in shared memory, the content, stored in the pristine storage.

The TOC provides search capability for a resource requested by the user 110 of the client device 102 in real time. In one or more embodiments, the TOC also keeps track of deleted files from the template and host layers. If the user 110 of the client device 102 deletes any of the files in the layers, though the files may not be physically removed from template/host layers, the files would not appear in the merged file system view for the user 110. Each virtual engine instance operates with one group of TOC trees. Each TOC group including a virtual TOC, a real TOC and a deleted TOC. The deleted TOC may store information associated with information in the layers marked as deleted.

In one or more embodiments, the virtual container 210 further includes a template module 306. The template module 306 may be configured to manage one or more applications accessed through the client device 102. One or more administrators of the client device 102 may group applications into one or more templates for ease of management. For example, consider a marketing template containing applications for users in marketing department. The system 100 disclosed herein enables, for example, an administrator to manage marketing applications once instead of managing at multiple client devices. One or more user defined templates may be inherited from one or more system defined root templates. In another embodiment, a user defined template may be inherited from another user defined template.

The root templates may include registry/directory structure specific to a host operating system. The client devices may be inherited from one or more user defined templates where the changes to templates are reflected in the client devices. The client devices represent a copy-on-write on the templates with the user specific changes. The template module 306 also allows creation of one or more templates by the administrator of the client device. In one or more embodiments, a new template may be created using one or more base templates in the root templates. The creation of the new template may involve a copy operation of the base template. Multiple versions (e.g., application template $112_1$-$112_N$) of a given template may be created and stored. A folder of a given template may include all the versions of the template as sub folders. In one or more embodiments, the virtual container 210 may further include an operating system translation module 304.

The operating system translation module 304 may be configured to provide mapping between the virtual desktop operating system and the operating system of the client device in terms of registry, files, services and the like, during run time. The operating system translation module 304 may also be configured to dynamically link to the root template (e.g., operating system root template 302) containing necessary run time DLLs, the executable, registry and file structure, based on the host operating system for the client device.

FIG. 4 illustrates a virtual file system (VFS) 450, according to one or more embodiments. In one or more embodiments, the virtual file system 450 may include layers (e.g., desktop layer, template layer, host layer and the like). The template layer contains all the resources associated with a given application (e.g., word template, outlook template, and the like). The VFS 450 virtualizes the files system associated with the resources required for execution, access/or installation of the application. Each application has different resources/files including, for example, exe files, dynamic linked library, data configuration files required, and the like. The VFS 450 combines together all the resources associated with the application. The VFS 450 combines the files from each application template, root template and makes the combination a part of a base template on the server device. In one or more embodiments, the VFS 450 may also be updated.

Also consider for example, a set of applications including a word processing application having resources virtualized in the desktop layer and the template layer, a database application having resources virtualized in the template layer, and an operating system application having resources virtualized in the host layer. The word processing application may have a text.txt file virtualized in the desktop and template layers and also may have a x.txt file virtualized in the template layer. Similarly, the database application may have a y.xls file virtualized in the template layer and the operating system application may have a z.txt file virtualized in the host layer of the VFS 450. All of the text.txt, x.txt, and z.txt may be organized in a common c directory within the VFS 450 as illustrated in FIG. 4.

The c drive would be virtualization of a hardware drive of the client device 102 containing the files associated with the word processing, data base and operating system applications. In one or more embodiments, the system 100 allows various applications to access files within application templates of other applications running on same/different operating systems, the application templates residing in same/different directory within the VFS 450. For example, the database application may be allowed to access the test.txt file of the word processing application during execution of the database application in the virtual container 210.

Figure 5:
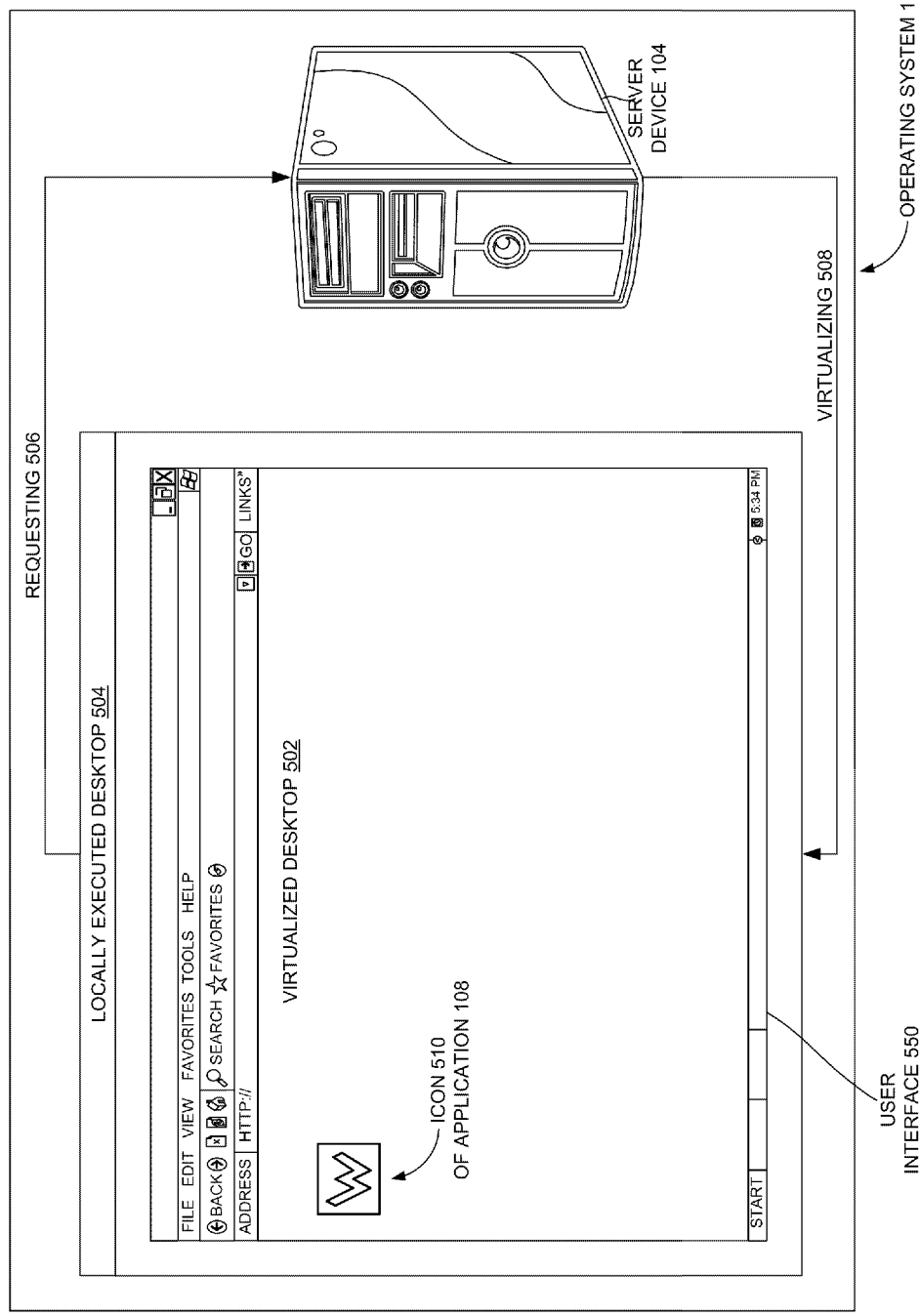
FIG. 5 is a user interface view of an operating system of the client device of system of FIG. 1, in accordance with one or more embodiments.

FIG. 5 is a user interface 550 view of an operating system 114 of the client device 102 of system 100 of FIG. 1, according to one or more embodiments. Particularly, FIG. 5 illustrates the server device 104, the operating system 114, a locally executed desktop 504, a requesting 506, a virtualizing 508, and a virtualized desktop 502, according to one or more embodiments. The locally executed desktop 504 may be a desktop (e.g., computer screen, mobile screen, etc.) on the client device 102 where an application is presented. The requesting 506 may be a request for customization of look and feel from the user to the server device 104 through the client device 102 based on the preference of the user. The virtualizing 508 may be the process of creating the virtual desktop 502 through the virtual container 210. The virtualized desktop may be an application (e.g., the virtual desktop) that may be created through the virtual container 210 of the server device 104.

In an example embodiment, FIG. 5 illustrates communication between the client device 102 and the server device 104. The client device 102 may request (e.g., the requesting 302) for an application from the server device 104. The server device 104 responds the client device 102 by virtualizing 508 through a virtual container 210. In one or more embodiments, the application installed on the server device 104 may be accessed through the client device 102. The application (e.g., client application, software application etc.) from the client device 102 (e.g., personal computer, a laptop etc.) may be executed without installing the application on the client device 102 when requested by a user (e.g., the user of FIG. 1) of the client device 102 through a binary module of the server device 104 that may emulate a set of function calls between the application and the operating system 114 of the client device 102. An application may run on the client device through a virtual container without installing the application on the client device 102, which may mean that the operating system 114 of the client device 102 may not be modified to perform the function calls between the application and the operating system 114.

An application component may be downloaded to the client device 102 when requested by a user (e.g., the user of FIG. 1) of the client device 102. The application component may be downloaded to a memory of the client device 102. The application component may be deleted from the memory (e.g., hard disk, RAM, magnetic disk etc.) of the client device 102 when the application executing on the client device 102 is inactive to prevent unauthorized duplication and/or access of the application. The application may be directly executed from the virtual container 210 through the binary module of the server device 104 emulating a set of function calls between the application and the operating system 114 of the client device 102 without downloading the application to the client device 102 (e.g., workstation, mobile device, etc.). The virtual container 210 may be software (e.g., simulated computer) that creates a virtualized environment that works with a host system (e.g., for executing an application without installing the application in the host device) even though it is independent of the host system (e.g., client device 102).

In one or more embodiments, look and feel of a desktop preference of the user may be recreated through the virtual container 210. The desktop preference may include an arrangement of files and/or folders in a file system, a color scheme of the file system, a background of the file system, an icon of the file system, an access control preference of the file system, a security preference of the file system, a bookmark associated with the user, a temporary file of the file system, a configuration of applications associated with the user, and a usability preference associated with the user. The desktop preference may be captured and stored to a user specific area of the server device 104 when the desktop preference is in use on the client device 102.

In one or more embodiments, the template module 306 of the virtual container 210 described in the description of FIG. 3, may be used to combine different application templates of a user desktop. The administrator may log in to a user desktop and/or an application template to install and/or upgrade an application. In case of template, a user desktops connected to the application template may automatically get the upgrade. In case of a user desktop, the user assigned to the desktop may get the upgrade. The update may include a patch installation to the application and/or an upgrade of the application. The binary module may include required resources between the application and the host operating system including a registry data, a file system data, and/or a DLL data. The server device 104 may have an application installed independent of any client-side operating system through the binary module of the server.

The server device 104 may execute the application directly from the virtual container 210 through the binary module emulating a set of function calls between the application and the host operating system of the server device 104 without downloading the application to the client device 102.

Figure 6:
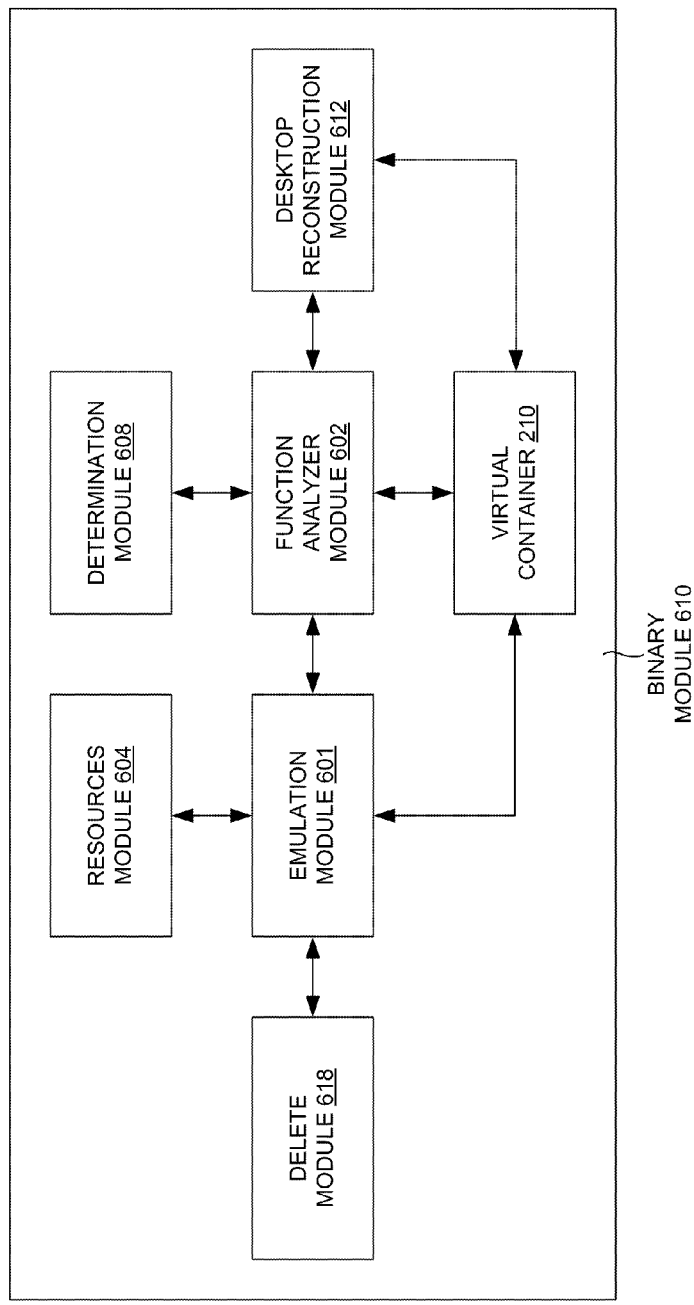
FIG. 6 is an exploded view of the binary module, in accordance with one or more embodiments.

FIG. 6 is an exploded view of the binary module 610, according to one or more embodiments. Particularly, FIG. 6 illustrates the applications, an emulation module 601, a function analyzer module 602, a resources module 604, a determination module 608, a desktop reconstruction module 612, and a delete module 618, according to one or more embodiments. The emulation module 601 may be a software program that may emulate (e.g., duplicate) a set of function calls between the operating system of the client device 104 and the application. The function analyzer module 602 may be software that may analyze the requirement of a particular function for emulation (e.g., may be at the time of access/execution of application). The resources module may allot and/or manage the resources (e.g., memory, etc.) for proper execution of the functions in the binary module 610. The determination module 608 may enable the binary module 610 to detect the client device 102 and/or the client device 102 based on a memory, microprocessor, and/or identification information of the coupled device.

The desktop reconstruction module 612 may reconstruct a look and feel desktop of the preference of the user. The delete module 618 may delete the application component from the client device 102 memory (e.g., the client device 102) when the application executing on the client device 102 is inactive to prevent unauthorized duplication and/or access of the application. The function analyzer module 602 may communicate with the emulation module 601 and the determination module 608.

The emulation module 601 may communicate with the resources module 604, the delete module 618, the function analyzer module 602, and the virtual container 210. The desktop reconstruction module 612 may communicate with the function analyzer module 602 and the virtual container 210. The desktop reconstruction module 612, the function analyzer module 601, and the emulation module 601 may communicate with the virtual container 210. The binary module 610 may communicate with the operating system of the client device 102.

The virtual container 210 may include a virtual file system. In one or more embodiments, the virtual file system may include one or more layers including, for example, a desktop file system layer, a host file system layer and a template file system layer. The layers may have different access modes. The access modes may include a read-only mode and/or a writable mode. In one or more embodiments, the .desktop layer may be accessed in the writable mode. The template layer and/or the host layer may be accessed in read-only mode. Each of the layers may include a file system and/or a registry.

During run time of an application accessed through the client device 102, the libraries required by the runtime are looked up from the desktop layer down to the host layer. The first match for a requested library is provided for the application. In one or more embodiments the virtual container 210 may be configurable by a list of storage layers (e.g. host, template1 . . . N, desktop). According to the list, the virtual container 210 may create required number of virtual engine instances that will operate with pair of storages (e.g. desktop-template N, template N-1-template N-2, . . . , template1-host) independently. The virtual engine uses TOC tress to keep track of files in different layers. TOC is a tree data structure, which represents in shared memory the content, stored in the pristine storage. TOC provides the search capability for a requested resource as fast as possible. The TOC may also keep track of deleted files from template and host layers.

Figure 7:
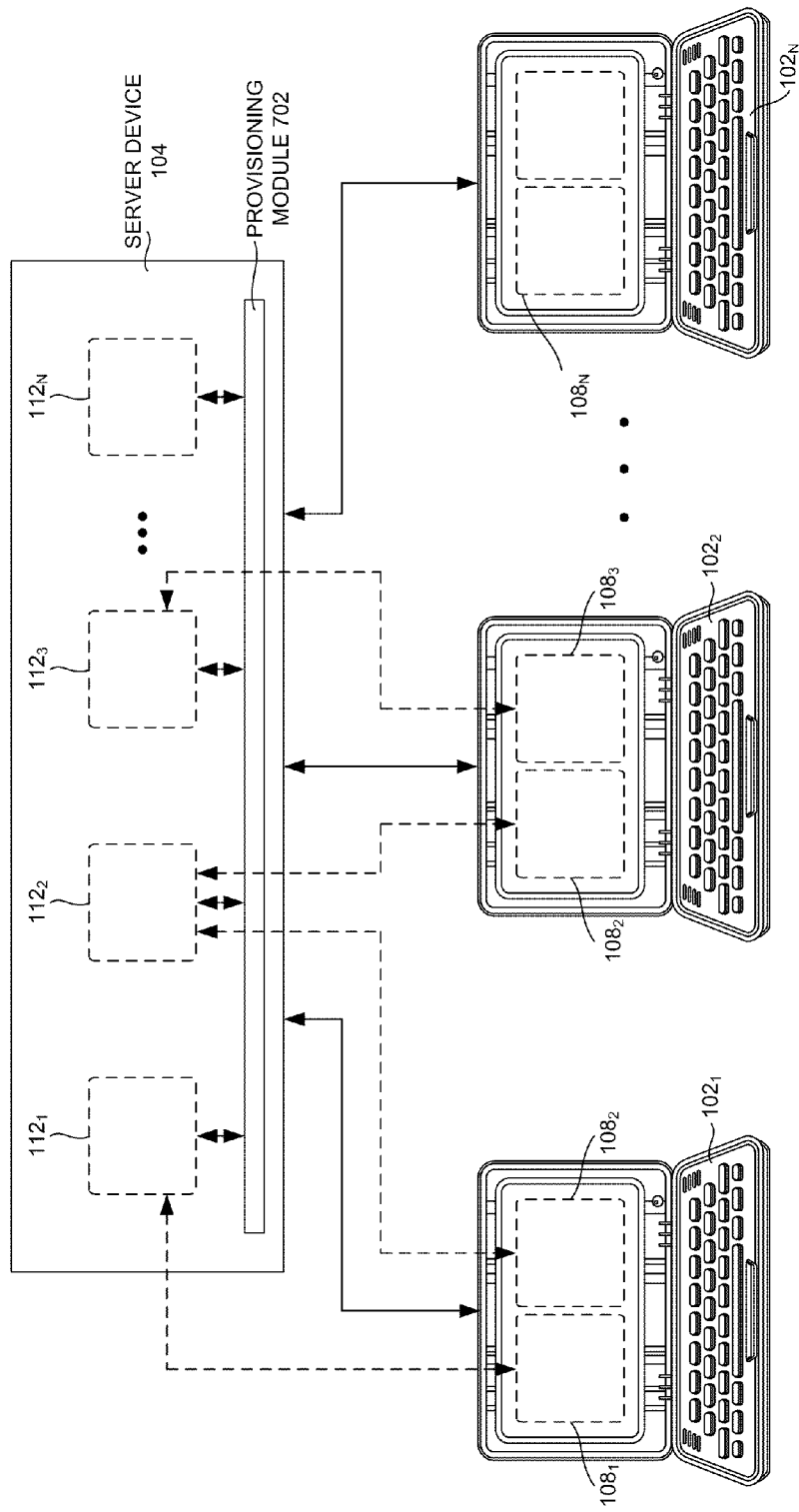
FIG. 7 illustrates multiple client devices accessing multiple applications through the server device, in accordance with one or more embodiments.

FIG. 7 illustrates multiple client devices (e.g., client device $102_1$-$102_N$) accessing multiple applications (e.g., applications $108_1$-$108_2$) through the server device 104, in accordance with one or more embodiments. In one or more embodiments, a provisioning module 702 may provide an application template for execution of each application of the client device 102. For example if a user of the client device $102_1$ desires to access an application $108_1$, the provisioning module 702 may provide an application template $112_1$ to provide all the necessary files and data for execution of the application $108_1$ on a host operating system of the server device 104. Depending on the need of the application $108_1$, the provisioning module 702 may choose one or more of the application templates ($112_1$-$112_N$) to provide to the client device 102 for execution of the application.

The applications ($108_1$-$108_N$) may however be installed on the server device 104 when the user initially tries to install the applications in the client devices ($102_1$-$102_N$). On providing appropriate application templates, the applications may be executed on a virtual container 210 of each of the client devices. A virtual container may be created for each of the client devices. In one or more embodiments, an application template (e.g. application template $112_1$) may contain application related resources including, for example, executables, libraries, images, data/configuration files, registry keys and values and the like. In one or more embodiments, by encapsulating the related resources in the application template, the application template may be made part of any number of client devices 102 by inheritance. In one or more embodiments, if an application (e.g., application 108) needs to the updated, the application template (e.g. application template 1120, containing the resources associated with the application, may be updated and all the inherited client devices (e.g., client devices $102_1$-$102_N$) may get the application update automatically. In one or more embodiments, provisioning a virtual client device and/or restoring a user client device may be almost immediately done since all the applications may already exist as application templates without the need to install the applications again. In one or more embodiments, the system 100 disclosed herein may enable one or more administrators to quickly provision a client device similar to user client device to troubleshoot any application installation/update issues without having a need for on-site visit and/or taking over user client device that may have impact on user productivity.

In one or more embodiments, each application template may be linked to a root template at the runtime of the virtual container either in user or in administrator mode. In one or more embodiments, the root template may contain registry/directory structure specific to the operating system of the client device 102. In one or more embodiments, the virtual container depending on the operating system may load the corresponding operating system translation engine which may in turn provide the link of the operating system specific root template.

In one or more embodiments, when a new application template is created, the new application template may have an empty file/registry structure. In one or more embodiments, administrator may log in to the new application template from the client device 102. In one or more embodiments, an editable copy of the new application template may be created at run time in a new location. In one or more embodiments, depending on the host operating system the new application template may be linked to the corresponding root template.

In one or more embodiments, the administrator may perform the installation of application, updates and/or patches. In one or more embodiments, the client device may capture all file/registry changes that may happen within a given session and may store the changes within a template structure instance associated with the given session. In one or more embodiments, upon exit, administrator may choose a version for the new template created. In one or more embodiments, administrator may choose to publish the new template version. In one or more embodiments, the client device may access the published template version under the template root folder with administrator provided version number. In one or more embodiments, all virtual client device instances may automatically inherit from the latest application template versions once published. In one or more embodiments, an application update may be installed once and may be made available to all user client devices instantly.

In one or more embodiments, once application templates are created and applications are installed, different client devices may be virtualized since they are just form containers of one or more application templates. In one or more embodiments, by removing an application template from a virtual container 112 of a client device 102, the corresponding application may also be removed from the virtual container instantly. In one or more embodiments, administrator may quickly create a virtual client device similar to the client device having all the user applications for troubleshooting any application issues.

FIG. 8 illustrates the virtual registry system 850, in accordance with one or more embodiments. The virtual registry system 850 allows merging of registry trees on the fly. The virtual registry system 850 may also allow programs under virtual container 210 to use registry information from desktop and host/template layers, specifying the rules and mechanisms of keys/values within the registry, and mechanism of accessing the keys and values within the registry from virtual container 210. The virtual registry system 850 may use the TOC tress to keep track of registry keys/values in different layers. The TOC may be a tree data structure, representing in shared memory the content, stored in the registry storage. One or more operations may be performed under registry in the virtual registry system 850. The operations may include, for example, key open operations for read and write operations, create/set operations, delete operations, query/enumeration operations summary, query/enumerate value functions, query/enumerate key functions, enumerate operations and virtual indexes mapping, enumerate key/value and virtual indexes mapping, and the like.

An example of a virtual index mapping algorithm for registry keys would include the steps including, finding the root key entry in full TOC, iterating sub entries of the root key in full TOC and filling the vector of pointers to the entries, sorting vector with all sub entries by name, iterating through the vector and filling the virtual indexes mapping table. An example of a pseudo-code of mapping table filling algorithm logic for the registry keys is as follows:

```
// REGISTRY KEYS VIRTUAL INDEXES MAPPING TABLE FILL
PSEUDOCODE
IndexMap - virtual indexes map
RealIndexes[MaxLayers] - array of real indexes on each layer
virtualIndex - virtual index
Iterator iter - vector iterator
do for iter from vector.begin to vector.end // iterating the vector
{
virtualIndex = 0;
updatedFlag = false;
do for layerId from MaxLayer to MinLayer // iterating the layers
{
    indexInMap = -1;
    if( TestLayer(layerId, iter) )
    {
```

```
            if( not IsDeleted(iter))
            {
                indexInMap = RealIndexes[layerId];
                updatedFlag = true;
            }
            ++(RealIndexes[layerId]);
        }
        IndexMap[layerId, virtualIndex] = indexInMap;
    }
    if(updatedFlag)
    {
        ++virtualIndex;
    }
}
```

FIG. 8 illustrates a set of registry keys, key id and corresponding virtual indexes. The key D with key id 1 is deleted from the template layer and hence does not have a virtual index.

FIG. 9 illustrates a virtual registry system 950 including registry values, in accordance with one or more embodiments. In the case of registry values, the values of the root key in registry tree may not be stored in sorted order and behave like elements in the vector. In one or more embodiments, the new elements may be pushed to the back of the vector. The deletion of element may be a simple erase of the element from the position of the element that also brings shifting of all other indexes by −1. To perform mapping virtual index to the real one, additional data may be stored and tracked in full TOC, representing the array and order (indexes) of registry values on each layer of the root template.

In one or more embodiments, for mapping registry values virtual indexes to real indexes on correspondent layer (RT) the one or more operations may be performed. The operations include, finding the root entry for values in fullToc, getting the TOC entry data value indexes struct from root entry, iterating through the value indexes struct vectors starting from a highest layer (e.g., desktop layer) and filling virtual indexes mapping table. An example of a pseudo code of filling mapping table algorithm for the registry values is as follows:

```
// REGISTRY VALUES VIRTUAL INDEXES MAPPING TABLE FILL
PSEUDOCODE
IndexMap - virtual indexes map
virtualIndex - virtual index
virtualIndex = 0;
// iterating the values in TOC vectors from Desktop to Host
do for tocVector from DesktopTocValuesVector to HostTocValuesVector
{
    // resize corresponding layerId array in map to virtualIndex elements
    // filled by value -1
    IndexMap[layerId].resize(virtualIndex, -1);
    realIndex = 0;
    // iterating the values in TOC vector
    do for tocVecIter from tocVector.begin( ) to tocVector.end( )
    {
        if( not IsDeleted(tocVecIter))
        {
            // get existing index that is stored in TOC entry
            // or -1 if it doesn't exist
            existingIndex = tocVecIter->GetExistingIndex( );
            if(existingIndex != -1)
            {
                IndexMap[layerId, existingIndex] = realIndex;
            }
            else
            {
                IndexMap[layerId, virtualIndex] = realIndex;
                tocVecIter->SetExistingIndex(virtualIndex);
                ++virtualIndex;
            }
        }
        ++realIndex;
    }
}
```

As illustrated in FIG. 9, number in each cell is real index of a registry value in the corresponding layer. The value is −1 indicates that the value does not exist on the layer or was deleted. In one or more embodiments, the virtual registry system (850/950) includes one or more of a virtualization engine, registry access component, and/or registry storage.

Figure 10:
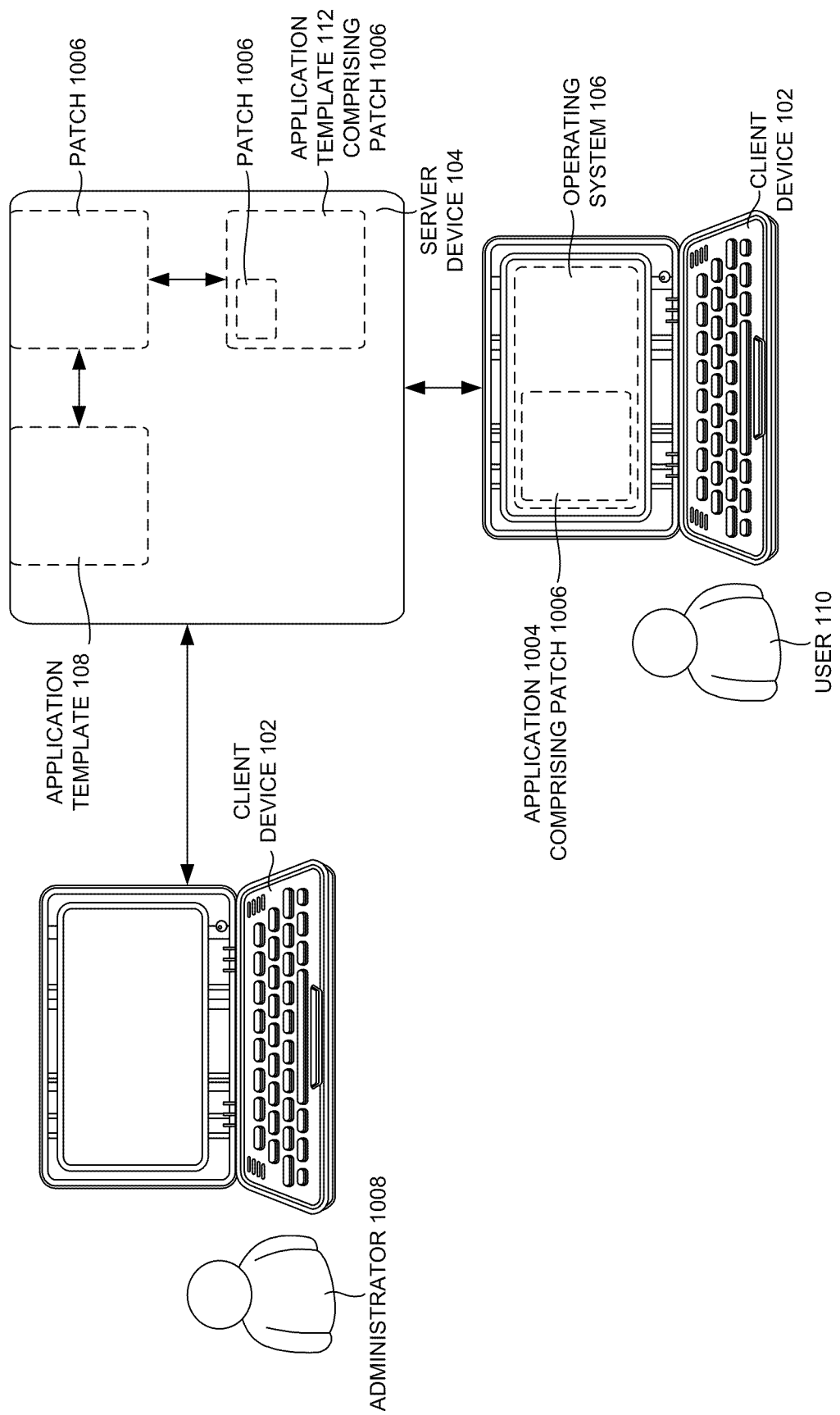
FIG. 10 illustrates the process of updating an application template in the system of FIG. 1, in accordance with one or more embodiments.

FIG. 10 illustrates the process of updating an application template 112 in the system 100 of FIG. 1, in accordance with one or more embodiments. In one or more embodiments, an administrator 1008 (e.g., system administrator, network administrator and the like) may be allowed to simultaneously and/or concurrently update the application template 112 across each of the multiple users. The update may include a patch 1006 installation to the application template 112 and/or an upgrade of the application template 112. The update may also be performed in order to update an existing application template 112 with one or more new applications. When an administrator runs the application on the client device 102, the server device 104 may list one or more available application templates (excluding root templates) and user desktops. In one or more embodiments, the administrator may log in to any of the listed application templates or user desktops.

Upon login, an editable copy of the application template 112 may be created in a new location. The administrator can then perform actions allowed in a typical user desktop including installation of any applications, updates and patches (e.g., patch 1006). During updating the application template 112, in one or more embodiments all file/registry changes happening within a given session may be captured and stored within the template structure instance. Upon exit, the administrator can choose a version for the new template created. The administrator can then choose to publish the new template version. The server device persists the new template version under the template root folder with administrator provided version number. Once published, new client device 102 instances would automatically inherit from the latest template version. In one or more embodiments, the administrator may also have a save as option to give a different name to the template instead of creating a version with the existing template, allowing the administrators to create a replica of the existing template instead of inheriting from the existing template. In the example scenario illustrated in FIG. 10, the administrator 1008 updates the application template 112 with the patch 1006 to create application 1004 including the patch 106.

Figure 11:
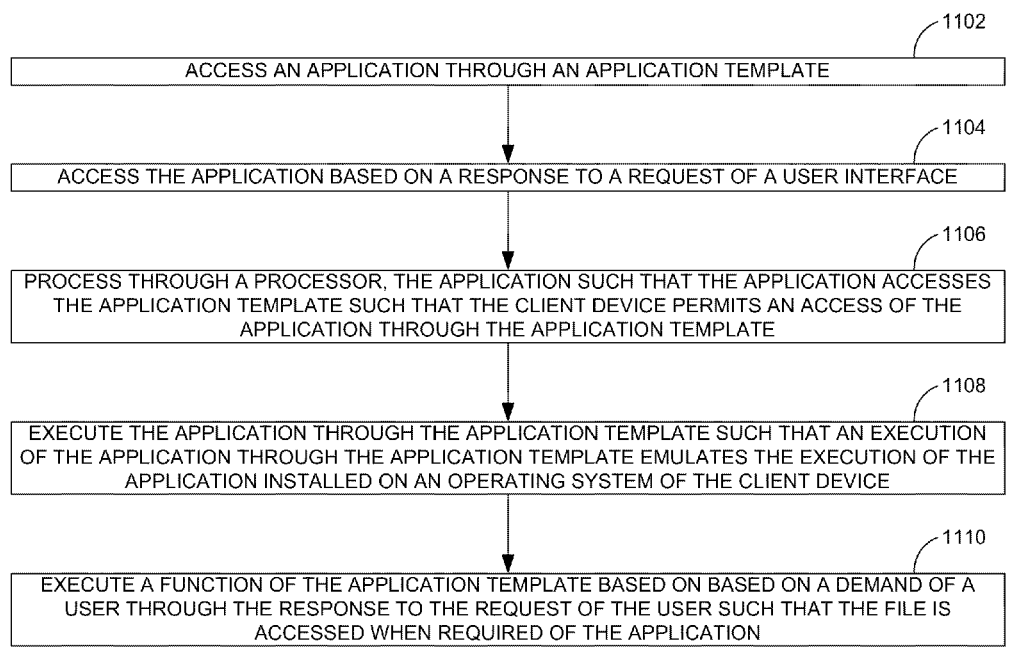
FIG. 11 is a process flow diagram detailing the operations of a client device as a part of a method of software application delivery through application template to a client device, in accordance with one or more embodiments.

FIG. 11 is a process flow diagram detailing the operations of a client device as a part of a method of software application delivery through application template to client device in a cloud computing environment, according to one or more embodiments. In one or more embodiments, in operation 1102, an application template may be created through the user interface of an administrator of the client device. In one or more embodiments, the application template may be created such that the application template may be coupled to one or more of the registry structure such that the application may be accessible to the user of the client device. In one or more embodiments, the application template may be created such that the application template may be editable through the user interface of the administrator.

In one or more embodiments, operation 1102 may involve accessing the application through an application template. The application template may reside on a server. The application template may include one of an executable, a library, an image, a configuration file, and a registry key such that the application through the application template may be accessible to the client device and another client through the application template. The application template of the client device 110 and the application template of another client device may be the same.

In one or more embodiments, operation 1104 may involve accessing the application based on a response to a request of a user interface. In one or more embodiments, operation 1106 may involve processing the application through a processor such that the application may access the application template such that the client device may permit an access of the application through the application template. In one or more embodiments, operation 1108 may involve executing the application through the application template such that an execution of the application through the application template may emulate the execution of the application installed on an operating system of the client device. In one or more embodiments, operation 1110 may involve executing a function of the application template based on a demand of a user through the response to the request of the user such that the file may be accessed when required of the application.

In one or more embodiments, the application template and the operating system of the client device may be translated based on the type of the operating system such that the application may be accessible to a user of the client device. In one or more embodiments, one of a registry structure and a directory structure may be processed such that the application may be accessible to the user of the client device based on a translation between the application template and the operating system of the client device.

In one or more embodiments, the client device may run in administrator mode and may capture all file and registry changes at the time of installation using the system disclosed herein. In one or more embodiments, the captured information may be directed to a virtual container on the server device instead of making the changes on the host system. In other words, an application template contains same file/directory structure & registry changes on the server device. For example, files getting created in c:\program files would actually be created on the server device, for example \\server\<app_template_name\program files would contain c:\windows=>\\server\<app_template_name>\windows, c:\documents and settings=>\\server\app_template_name\documents and settings, and the like. In one or more embodiments, changes to the registry may be captured and stored under \\server\app_template_name Windows\system32\config\noma. In one or more embodiments, in addition to storing the actual files and registry keys and values on the server, the virtual drive may also store TOC (table of contents) to keep track of files/registry keys/values in the application template. For example: a simple application wordpad may install wordpad.exe under c:\program files/wordpad and may create a registry entry under HKEY_LOCAL_MACHINE\software\wordpad.

In one or more embodiments, an update of the application may be permitted through a patch 1006 applied to the application template through the user interface of the administrator 1008. In one or more embodiments, the application template may be created that may include the patch 1006 such that the application template including the patch 1006 may be accessible to the user of the client device. In one or more embodiments, the application template may be accessed automatically that may include the patch 1006 through the client device such that the application template including the patch 1006 may be accessed when the application may be requested. The file of the application template may be cached on the client device such that the latency may be reduced when running the application through the server.

In one or more embodiments, during creating the template a file system based on the file of a layer such that the file of the layer, another file of another layer, and yet another file of yet another layer may be accessible to the user of the application. The layer may be a desktop layer, the another layer may be a template layer, and the yet another layer may be a host layer, such that the file of the desktop layer may be prioritized over the file of the template layer and the template layer may be prioritized over the host layer. In one or more embodiments, a registry system may be created based on an algorithm. The algorithm may map the registry key and a registry value of the layer, the another layer, and the yet another layer, such that the registry key and the registry value may be accessible through the registry system.

In one or more embodiments, the application may be executed through the application template such that a setting may be customizable through the response of the request of the user such that the setting may be accessible to the user when the application may be accessed. In one or more embodiments, the application template may be accessed through a software as a service model through a cloud environment such that the application may be accessible through the application template. The user of the client device and another user of another client device may access the application through the application template. The application template of the client device and the application template of another client device may be the same. The method of the client device may be in a form of a machine-readable medium embodying a set of instructions that when executed by a machine may cause the machine to perform the method of the client device.

Figure 12:
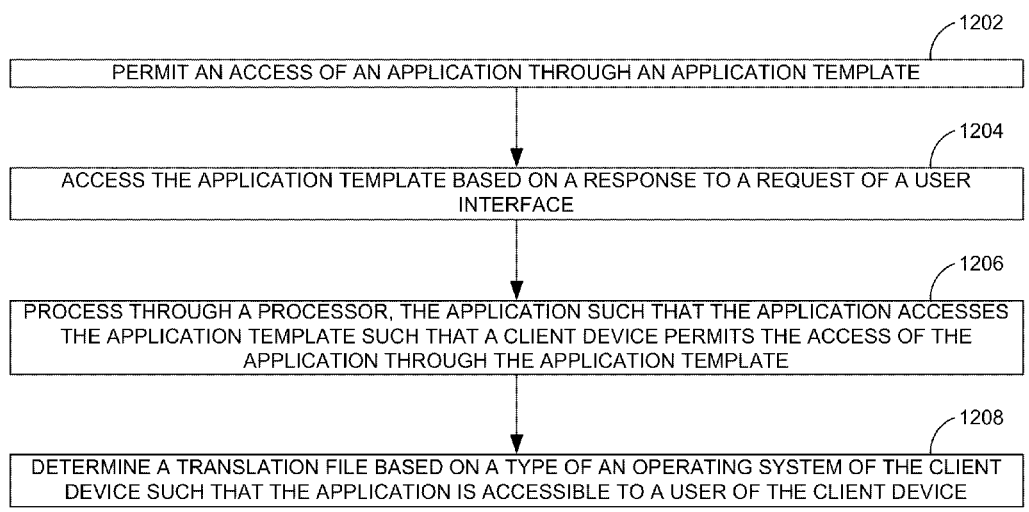
FIG. 12 is a process flow diagram detailing the operations of a server device as a part of a method of software application delivery through application template to a client device, in accordance with one or more embodiments.

FIG. 12 is a process flow diagram detailing the operations of a server device as a part of a method of software application delivery through application template to client device, according to one or more embodiments. In one or more embodiments, operation 1202 may involve permitting an access of an application through an application template. The application template may reside on a server device. In one or more embodiments, the application template may include one or more of an executable, a library, an image, a configuration file, and a registry key. In one or more embodiments, operation 1204 may involve accessing the application template based on a response to a request of a user interface. In one or more embodiments, operation 1206 may involve processing the application through a processor such that the application may access the application template such that a client device may permit the access of the application through the application template. In one or more embodiments, operation 1208 may involve determining a translation file based on a type of an operating system of the client device such that the application may be accessible to a user of the client device.

In one or more embodiments, the access of another application of the client device may be permitted such that the another application may be accessible through the another application template. The another application template may replace the application template such that the another application template may be a later version of the application template. In one or more embodiments, the access of the application may be permitted through the application template such that a setting may be customizable through the response of the request of the user such that the setting may be accessible to the user when the application may be accessed. In one or more embodiments, a file of the application template may be accessed based on a demand of the user through the response to the request of the user such that the file may be accessed when required of the application.

In one or more embodiments, the access of the application template may be permitted through a software as a service model through a cloud environment such that the application may be accessible through the application template. The user of the client device and another user of another client device may access the application through the application template. The application template of the client device and the application template of the another client device may be the same. In one or more embodiments, the access of the application may be permitted through the application template such that the application may be accessible to the client device and another client device through the application template. The application template of the client device and the application template of the another client device may be the same. In one or more embodiments, the access of the application may be permitted through a binary module coupled to the application template. The binary module may emulate a set of a function call between the application and the operating system of the client device.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C#, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network. One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be

What is claimed is:

1. A method of a client device having an operating system and a user interface, the client device being operatively coupled to a server device through a network, the method comprising:
  creating, at the server device, a virtual container wherein creating the virtual container comprises: creating a base template comprising folder structures of the client device copied from the client device to the server device and creating based on the base template one or more application templates, wherein each application template provides the client device access to one application of a one or more applications;

accessing, on-demand, the one or more applications through the one or more application templates based on one or more requests provided through the user interface; and executing the one or more applications through the one or more application templates such that the execution of the one or more applications through the one or more application templates emulates an execution of the one or more applications installed on the operating system of the client device.

2. The method of claim 1, wherein, the application template comprises one of an executable, a library, an image, a configuration file, and a registry key such that the application through the application template is accessible to the client device and another client device through the application template, the application template of the client device and the application template of the another client device being the same.

3. The method of claim 1, further comprising:
translating between the application template and the operating system of the client device based on the type of the operating system such that the application is accessible to a user of the client device; and
processing one of a registry structure and a directory structure such that the application is accessible to the user of the client device based on a translation between the application template and the operating system of the client device.

4. The method of claim 3, further comprising:
creating the application template through a user interface of an administrator of the client device;
creating the application template such that the application template is coupled to one of the registry structure and the directory structure such that the application is accessible to the user of the client device; and
creating the application template such that the application template is editable through the user interface of the administrator.

5. The method of claim 4, further comprising:
permitting an update of the application through a patch applied to the application template through the user interface of the administrator;
creating the application template comprising the patch such that the application template comprising the patch is accessible to the user of the client device; and
accessing automatically the application template comprising the patch through the client device such that the application template comprising the patch is accessed when the application is requested.

6. The method of claim 1, further comprising:
caching a file of the application template on the client device such that a latency is reduced when running the application through the server.

7. The method of claim 2, further comprising:
creating a file system based on the file of a layer such that the file of the layer, another file of another layer, and yet another file of yet another layer are accessible to a user of the application, wherein the layer is a desktop layer, the another layer is a template layer, and the yet another layer is a host layer, such that the file of the desktop layer is prioritized over the file of the template layer and the template layer is prioritized over the host layer.

8. The method of claim 7, further comprising:
creating a registry system based on an algorithm, wherein the algorithm maps the registry key and a registry value of the layer, the another layer, and the yet another layer, such that the registry key and the registry value are accessible through the registry system.

9. The method of claim 1, further comprising:
executing the application through the application template such that a setting is customizable through a response of the request of the user such that the setting is accessible to the user when the application is accessed.

10. The method of claim 1, further comprising:
accessing the application template through a software as a service model through a cloud environment such that the application is accessible through the application template, wherein the user of the client device and another user of another client device access the application through the application template, wherein the application template of the client device and the application template of the another client device are the same.

11. The method of claim 1, in a form of a non-transitory machine-readable medium embodying a set of instructions that, when executed by a machine, causes the machine to perform the method of claim 1.

12. A method of a server device, the server device being operatively coupled through a network to a client device having an operating system and a user interface, the method comprising:
creating, at the server device, a virtual container wherein creating the virtual container comprises: creating a base template comprising folder structures of the client device copied from the client device to the server device, creating based on the base template one or more application templates, and creating one or more translation files, wherein each application template provides the client device access to one application of a one or more applications;
permitting the client device to access the one or more applications on-demand through the one or more application templates;
and determining a translation file based on a type of the operating system of the client device such that the one or more applications are accessible to a user of the client device.

13. The method of claim 12, wherein,
the application template comprises one of an executable, a library, an image, a configuration file, and a registry key.

14. The method of claim 12, further comprising:
permitting access of another application of the client device such that the another application is accessible through another application template, wherein the another application template replaces the application template such that the another application template is a later version of the application template.

15. The method of claim 12, further comprising:
permitting the access of the application through the application template such that a setting is customizable through a response of a request of the user such that the setting is accessible to the user when the application is accessed.

16. The method of claim 15, further comprising:
accessing a file of the application template based on a demand of the user through the response to the request of the user such that the file is accessed when required of the application.

17. The method of claim 12, further comprising:
permitting the access of the application template through a software as a service model through a cloud environment such that the application is accessible through the application template, wherein the user of the client device and another user of another client device access the application through the application template, wherein the application template of the client device and the application template of the another client device are the same.

18. The method of claim 12, further comprising:
permitting the access of the application through the application template such that the application is accessible to the client device and another client device through the application template, wherein the application template of the client device and the application template of the another client device are the same.

19. The method of claim 12, further comprising:
permitting the access of the application through a binary module coupled to the application template, wherein the binary module emulates a set of a function call between the application and the operating system of the client device.

20. A system comprising:
a client device having an operating system and a user interface;
a network; and
a server operatively coupled to the client device through the network, the server having a virtual container comprising: a base template comprising folder structures of the client device copied from the client device to the server device and one or more application templates created based on the base template, wherein each application template provides the client device access to one application of a one or more applications;
wherein the client device is configured to access, on-demand, the one or more applications through the one or more application templates based on one or more requests provided through the user interface; and
wherein the client device is further configured to execute the one or more applications through the one or more application templates such that the execution of the one or more applications through the one or more application templates emulates an execution of the application installed on the operating system of the client device.

* * * * *